United States Patent [19]

Maurer et al.

[11] 3,911,365

[45] Oct. 7, 1975

[54] NARROWBAND RECEIVING SYSTEM WITH IMPROVED SIGNAL TO NOISE RATIO

[75] Inventors: Robert Maurer, Laatzen near Hannover; Karl-Heinz Löcherer, Langenhagen, both of Germany

[73] Assignee: Licentia Patent-Verwaltungs-G.m.b.H., Frankfurt am Main, Germany

[22] Filed: Oct. 26, 1972

[21] Appl. No.: 301,242

[30] Foreign Application Priority Data

Oct. 26, 1971 Germany ........................... 2153244

[52] U.S. Cl. ................ 325/346; 307/88.3; 325/419

[51] Int. Cl. ............................................. H03c 3/06

[58] Field of Search........... 321/69 R; 325/421, 425, 325/442, 485, 419, 346; 307/88.3

[56] References Cited

UNITED STATES PATENTS

| | | | |
|---|---|---|---|
| 3,237,017 | 2/1966 | Maurer | 307/88.3 |
| 3,353,099 | 11/1967 | Hayasi et al. | 325/421 |
| 3,544,899 | 12/1970 | Gusyatinsky | 325/329 |
| 3,699,454 | 10/1972 | Hudspeth | 307/88.3 |
| 3,784,916 | 1/1974 | Maurer | 307/88.3 |

*Primary Examiner*—George H. Libman
*Attorney, Agent, or Firm*—Spencer & Kaye

[57] ABSTRACT

In a receiver system for high frequency signals which are either AM or FM modulated with a low frequency signal, which receiver system has at least a mixer stage and a demodulator and an input band width which is so narrow that the received high frequency signal can just be transmitted without distortion, the signal to noise ratio of the receiver system is reduced to below the value one by feeding back a portion of the demodulated low frequency signal to the oscillator of the mixer.

12 Claims, 8 Drawing Figures

NARROWBAND RECEIVING SYSTEM WITH IMPROVED SIGNAL TO NOISE RATIO

BACKGROUND OF THE INVENTION

The present invention relates to a receiving system having an input band width which is so narrow that the received modulated HF signal can just yet be transmitted without distortion.

As shown in FIG. 1, a conventional AM or FM receiver generally includes a preamplifier VV, a converter M with an associated oscillator O, an IF amplifier V and, depending on the type of modulation employed, either an AM or FM demodulator D.

The sensitivity of a receiver is determined by the noise factor $F_{total}$ which is calculated according to equation (1) and is thus determined by the noise factors $F_1$, $F_2$ and $F_3$ of the first, second and third receiving stages, respectively, and the available signal gains $V_{S,1}$ and $V_{S,2}$ of the first two stages, respectively:

$$F_{total}=F_1+\frac{F_2-1}{V_{S,1}}+\frac{F_3-1}{V_{S,1}\cdot V_{S,2}} \qquad (1)$$

With sufficiently high amplification in the first receiving stage, $F_{total}$ is determined substantially only by the noise in the first receiving stage.

The general definition of the noise factor $$F_{total}=\frac{\left(\frac{S}{N}\right)_I}{\left(\frac{S}{N}\right)_O} \qquad (2)$$

thus determines, with a given signal to noise ratio at the input $(S/N)_I$, the signal to noise ratio $(S/N)_O$ at the output of the linear active portion of the receiver, i.e. before the demodulator.

With low noise preamplifiers, such as cooled, parametric amplifiers for example, $F_1 \approx 1$ and thus, with a sufficiently high available signal gain $V_{S1}$ is $$\left(\frac{S}{N}\right)_O \approx \left(\frac{S}{N}\right)_I$$

i.e., the signal to noise ratio under these conditions is practically unchanged in the low noise, linear active portion of the receiver.

The type of modulation of the received signal then determines the low frequency signal to noise ratio $(S/N)_{LF}$. Thus, for example, in a receiver for a single sideband AM signal with a suppressed carrier the low frequency signal to noise ratio $(S/N)_{LF}$ is improved by the factor 2 as compared to the high frequency signal to noise ratio $(S/N)_O$ before the demodulator. Thus, the following relationship exists between $(S/N)_{LF}$ and $(S/N)_I$:

$$\left(\frac{S}{N}\right)_{LF}=2\cdot\frac{\left(\frac{S}{N}\right)_I}{F_{total}} \qquad (3)$$

and with a low noise prestage, i.e., $F_1 \approx 1$, with high gain $$\left(\frac{S}{N}\right)_{LF}\approx 2\cdot\left(\frac{S}{N}\right)_I \qquad (4)$$

For FM modulated signals it is known that during demodulation with ideal amplitude limiting, an improvement is realized in the low frequency signal to noise ratio according to the equation $$\left(\frac{S}{N}\right)_{LF}=3\eta^2\cdot\left(\frac{S}{N}\right)_O \qquad (5)$$

where $\eta$ represents the modulation index of the FM signal. Thus, the following relationship applies for the high frequency signal to noise ratio at the input $(S/N)_I$ and the low frequency signal to noise ratio $(S/N)_{LF}$:

$$\left(\frac{S}{N}\right)_{LF}=3\eta^2\cdot\frac{\left(\frac{S}{N}\right)_I}{F_{total}} \qquad (6)$$

and with low noise preamplification and sufficiently high available signal gain:

$$\left(\frac{S}{N}\right)_{LF}\approx 3\eta^2\cdot\left(\frac{S}{N}\right)_I \qquad (7)$$

The noise factor F, as it was used above to calculate the receiver sensitivity, is defined for the individual linear active, noisy amplifier four-terminal networks according to FIG. 2 by the equation $$F=\frac{\frac{S_1}{N_1}}{\frac{S_2}{N_2}}=\frac{S_1\cdot N_2}{S_2\cdot N_1} \qquad (8)$$

or, if $$N_2=V_S\cdot N_1+N_i$$

and $$S_2=V_S\cdot N_1 \qquad (9)$$

it can be expressed as follows:

$$F=\frac{N_1\cdot V_S+N_i}{N_1\cdot V_S}=1+\frac{N_i}{N_1\cdot V_S}=1+F_Z \qquad (10)$$

where $$F_Z=\frac{N_i}{N_1\cdot V_S} \qquad (11)$$

is the excess noise factor of the linearly active four-terminal network and $N_i/N_1\cdot V_S$ represents the internal noise power of the four-terminal network with respect to the input of the four-terminal network.

The prerequisite in this consideration of the noise factor of the linear active, noisy four-terminal network is that the input noise power $N_1$ is amplified in the same manner as the input signal power $S_1$ by the available signal gain $V_S$. Due to the unavoidable quantum noise the minimum noise factor is limited so that the following relationship always applies:

$$N_i > 0,\ F_Z > 0 \text{ and thus } F > 1 \qquad (12)$$

The linear active amplifier components thus always cause the signal to noise ratio to become worse. However, an improvement in the signal to noise ratio of the receiver is realized, depending on the type of modulation, during the demodulation, i.e. the required nonlinearities during the demodulation process effect, in addition to the recovery of the low frequency information, a change in the low frequency signal to noise ratio.

It is known that a signal contained in noise can be "lifted out" of the noise by constructing the receiving system so that it has an extremely narrow band width. Constructing the receiver in this manner has its limits, however, since the signal must be transmitted in such a manner that it will not be distorted by too narrow a band width.

SUMMARY OF THE INVENTION

It is therefore the object of the present invention to substantially improve the signal to noise ratio of a receiving system of the type which already has such a narrow input band width that the received high frequency (HF) signal can just yet be transmitted without distortion.

According to the present invention, in a receiving system for a high frequency carrier wave which is modulated with a low frequency signal, which system includes at least a mixer stage, with its associated oscillator, for the received high frequency signal and a demodulator connected to the output of the mixer, and which system has such a narrow input band width that the received high frequency signal can just yet be transmitted without distortion, the noise factor of the system is reduced to below the value one by feeding back a portion of the demodulated low frequency signal present at the output of the system to the (pump) oscillator of the mixer.

DESCRIPTION OF THE PREFERRED EMBODIMENTS

Figure 1:
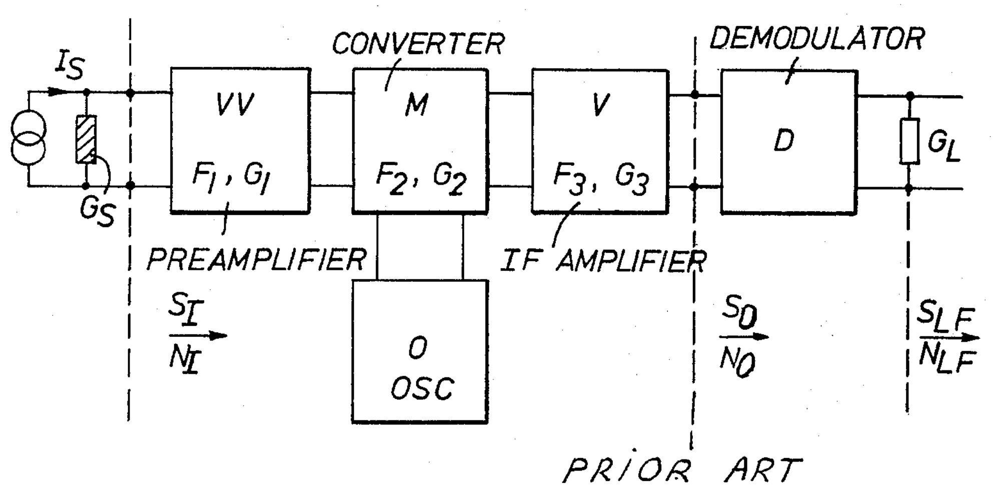
FIG. 1 is a block diagram of a conventional high frequency receiver system according to the prior art used in explaining the invention.
Figure 2:
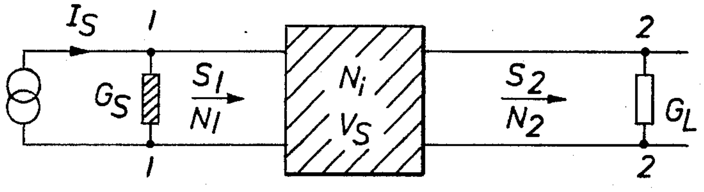
PRIOR ART FIG. 2
FIG. 2 is a block diagram used to illustrate the signal to noise relationships in a linear active four-terminal network.
Figure 3:
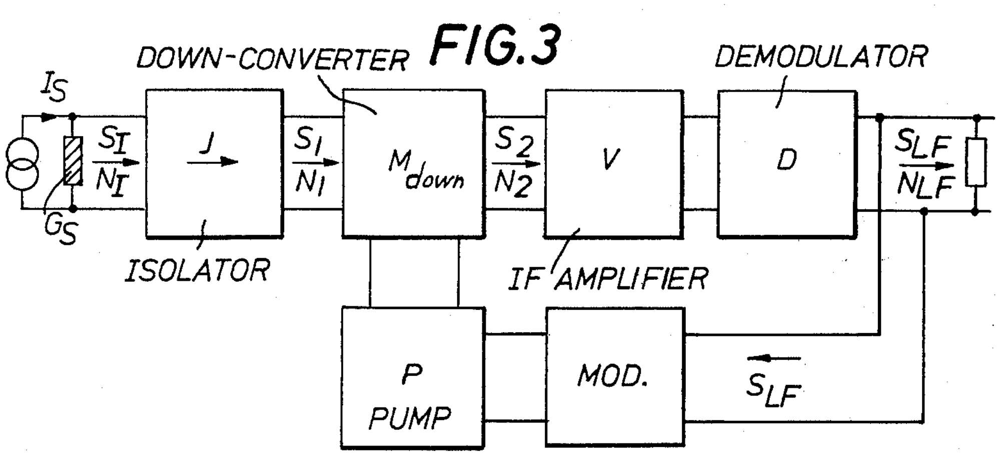
FIGS. 3–5 are block diagrams of various embodiments of a high frequency receiver constructed according to the invention.

Referring now to FIG. 3, there is shown, in block form, the structure of an AM or FM receiver which has a parametric down-converter operating in the frequency inverting case as its input stage and whose pump source is AM or FM modulated, depending on the type of modulation of the input signal, by feeding back the low frequency demodulated signal. In order to transpose the received signal to the intermediate frequency, it contains a parametric down-converter $M_{down}$ operating in the frequency inverting case at its input. To increase the stability, an isolator J is connected in this input circuit between the signal source and the parametric down-converter $M_{down}$. The isolator J prevents fluctuations in the conductance of the source $G_S$ from being transmitted to the input of the parametric down-converter $M_{down}$, thus avoiding instabilities as a result of the known negative input conductance of parametric converters operating in the frequency inverting case. The output of down-converter $M_{down}$ is connected to an intermediate frequency amplifier V and then to an AM or FM demodulator D. Connected to the down-converter $M_{down}$ is an oscillator or pump source P. According to the invention, a portion of the low frequency voltage signal $S_{LF}$ appearing at the low frequency output of the receiver, i.e., the output of demodulator D, is fed back to the pump source P via a modulator Mod so that the pump source signal will be modulated with the low frequency output signal. The modulator will either be an AM or an FM modulator depending on the type of modulation selected for the input signal, that is, the pump source will be AM modulated in the case of an AM modulated input signal and FM modulated in the case of an FM modulated input signal.

To recognize the information without interference, the low frequency signal to noise ratio should be as high as possible so that a theoretic consideration can be based on a noise-free AM or FM modulated pump signal. With this determination of the low frequency signal to noise ratio $(S/N)_{LF}$ and knowledge of the attainable noise factor for the high frequency receiver portion, the high frequency signal to noise ratio at the input of the receiver is also given, for example for a single sideband AM receiver, by equation (3) or (4), respectively.

By feeding back the low frequency signal for the purpose of AM or FM modulating the pump source of the parametric down-converter $M_{down}$, an improvement of the signal to noise ratio $S_2/N_2$ at the IF output of the down-converter $M_{down}$ can be realized as explained below.

With an FM modulated input and pump signal, the output band width of the down-converter $M_{down}$ can be reduced while still maintaining an undistorted FM signal on the IF side, i.e., the input to the IF amplifier V. Due to this band width compression with respect to the required input band width, the theory for the parametric converter operating in the frequency inverting case with an FM modulated pump source furnishes the following noise factor:

$$F = \frac{B_H}{B_S} \cdot \left[ 1 + \frac{s}{p-s} \cdot \frac{G_S}{G_N} \right] \qquad (13)$$

With an unmodulated pump source (modulation index $\eta_p = 0$) the undistorted intermediate frequency FM signal is transposed in that the output band width $B_O = B_H$ is made equal to the input band width $B_I = B_S$ so that equation (13) will produce $$F = F_O = 1 + \frac{s}{p-s} \cdot \frac{G_S}{G_N} \qquad (14)$$

the known noise factor for the parametric converter in the frequency inverting case.

Due to the compression of the output band width $B_O$ with respect to the input band width $B_I$ for the FM modulated pump source, the intermediate frequency signal to noise ratio $S_2/N_2$ is substantially improved compared to the high frequency signal to noise ratio $S_1/N_1$ or the noise factor F, respectively, i.e. with the corresponding modulation index $\eta_p$ there exists the possibility that $F < 1$.

With an AM modulated input and pump signal the theory for the parametric converter operating in the frequency inverting case furnishes the following noise factor when the modulation factor $m_p$ for the pump source is not too high:

$$F = \frac{V_R}{V_S} \cdot \left[ 1 + \frac{s}{p-s} \cdot \frac{G_S}{G_S} = \right] \frac{V_R}{V_S} \cdot F_O \qquad (15)$$

In the case of AM modulation there thus occurs different amplification $V_S$ or $V_R$ of the signal power $S_1$ and the noise power $N_1$, so that in this case improvement of the noise factor and thus of the output signal to noise ratio $S_2/N_2$ is realized, according to the theorem for $m_p > 0$, $V_S > V_R$, by feeding back the low frequency output voltage if the latter is used in AM reception for the AM modulation of the pump source P.

Figure 4:
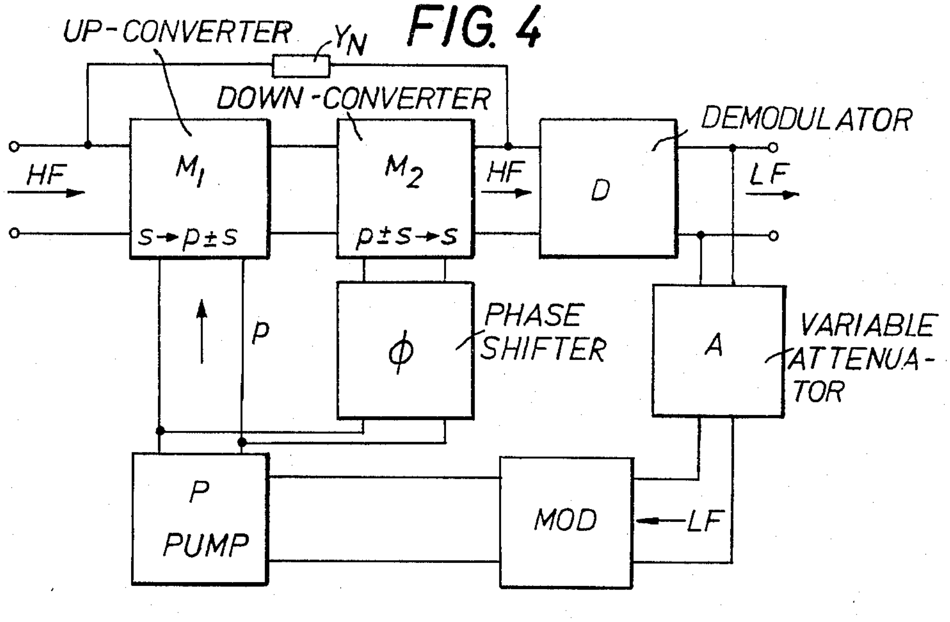

This principle of AM or FM modulation of the pump source by means of the low frequency output voltage which is fed back from the receiver output can also be used for a nonreciprocal converter cascade preamplifier so that in the nondegenerated case straight preamplifiers with $F < 1$ can be realized. In this connection, reference is made to FIG. 4 in which the principal circuit diagram of such a converter cascade is shown. It includes a cascade of an up-converter $M_1$ and a down-converter $M_2$. The nonlinear elements of the converters, preferably capacitance diodes, are controlled by a common pump source P with different phases, the different phases being produced by the insertion of a phase shifter $\phi$ between the output of the pump source and the converter $M_2$. The feedback admittance of the converter cascade is neutralized by a two-terminal network $Y_N$ inserted between the input and the output of the converter cascade. The output of the converter cascade is connected to a demodulator D at whose output the low frequency demodulated signal appears. A portion of the low frequency signal is taken off and fed back to the pump source P via a modulator Mod so as to modulate the pump source in a manner, similar to that in FIG. 3. Such nonreciprocal converter cascade amplifiers are disclosed, for example, in U.S. Pat. No. 3,237,017, issued Feb. 22, 1966 (see also Proc. IEEE vol. 51, No. 11, Nov. 1963, 1589–1598).

Figure 6:
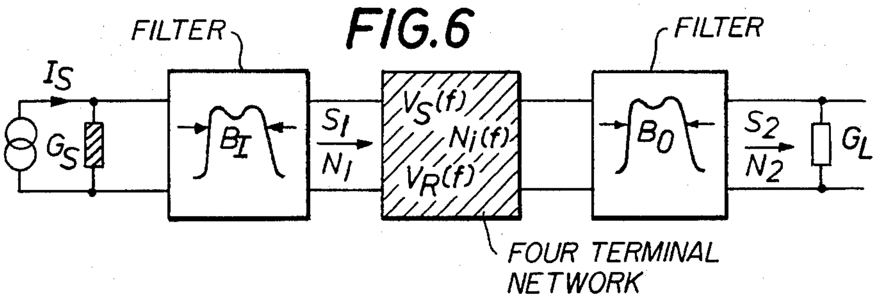
FIGS. 6 and 7 are block diagrams used to explain the extended definition of the noise factor for active four-terminal networks with different values of the signal and noise power gains.
Figure 8:
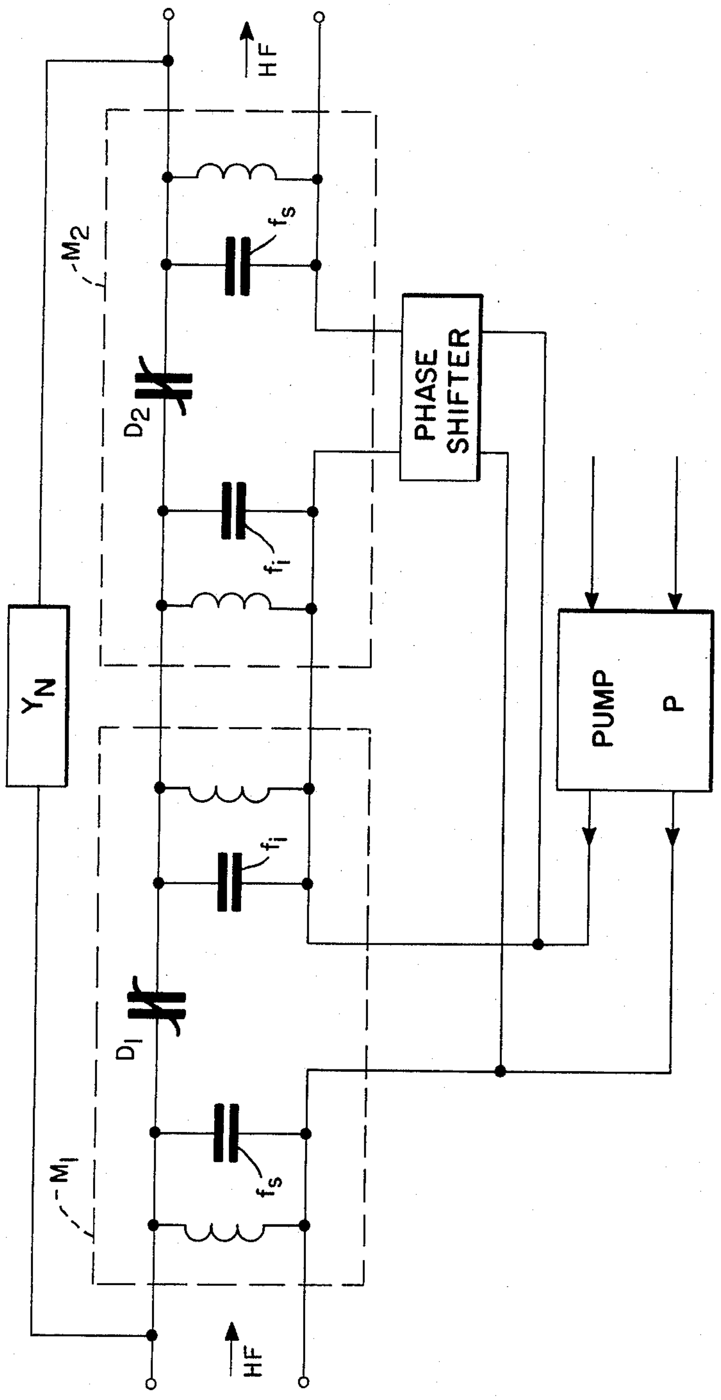
FIG. 8 is a circuit diagram of the nonreciprocal converter cascade amplifier of FIG. 4.

FIG. 8, which corresponds to FIG. 6 of the above mentioned patent, shows a circuit for an example of such a converter cascade of parametric amplifiers. As shown in this figure, each converter $M_1$ or $M_2$ includes a non linear capacitance diode $D_1$ or $D_2$ respectively and a pair of tuned resonant LC circuits one of which constitutes the idler circuit and as shown is tuned to the idler frequency $f_i$.

Figure 5:
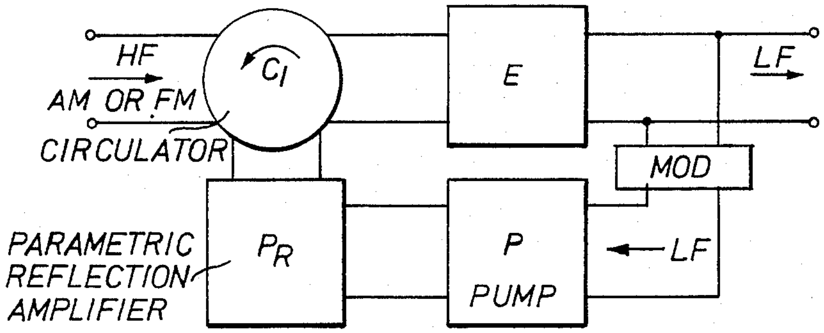

A further possibility for utilizing the present invention is shown in FIG. 5. In this embodiment of the invention, the input stage of the receiver is formed by a circulator Ci of conventional construction to which is connected a parametric reflection amplifier $P_R$ having a pump source P. According to the invention, a substantial improvement of the noise factor of the receiver is again realized by feeding back a portion of the low frequency signal produced at the output of the receiver, the remaining components of which are generally indicated by the block E, to the pump source P of the reflection amplifier $P_R$ via a modulator Mod. The entire amplifier system other than the feedback path is constructed in a known manner (see e.g. Blackwell and Kotzebue Semiconductor-Diode Parametric Amplifiers Prentice Hall Inc. 1961, p. 57)

Compared to the consideration of the noise factor for linearly active four-terminal networks, the above embodiments obviously require a clarification of the term noise factor. It can be seen from the examples under consideration that there are four-terminal networks which process the signal and noise power differently. In order to arrive at a clarification of the formulation of the noise factor, these conditions must be considered when deriving the noise factor and the four-terminal network must be designed, as discussed below, in accordance with FIG. 6 which is a simplified block circuit diagram showing a four terminal network with input and output filters.

With the known definition for the noise factor $$F = \frac{\left(\frac{S_1}{N_1}\right)}{\left(\frac{S_2}{N_2}\right)} = \frac{S_1 \cdot N_2}{S_2 \cdot N_1}$$

and if the spectral signal and noise power densities $s(f)$ and $n(f)$ and the spectral gains $v_S(f)$ and $v_R(f)$ (for converters the conversion gains) are introduced, and with ideal filters $$N_1 = \int_O^\infty n_1(f)df$$

$$s_1 = \int_O^\infty s_1(f)df$$

$$S_2 = \int_O^\infty v_S(f) \cdot s_1(f)df = V_S s_1$$

$$N_2 = \int_O^\infty v_R(f) \cdot n_1(f)df + \int_O^\infty n_i(f)df$$

$$N_i = \int_O^\infty n_i(f)df \qquad (16)$$

so that the following noise factor is obtained:

$$F = \frac{\int_O^\infty s_1(f)df \cdot \left[\int_O^\infty v_R(f) \cdot n_1(f)df + \int_O^\infty n_i(f)df\right]}{\left[\int_O^\infty v_S(f) \cdot s(f)df\right] \cdot \int_O^\infty n_1(f)df} \qquad (17)$$

If ideal filter characteristics $B_i$ at the input and $B_o$ at the output and white noise $n_1 = \text{const.}$, $n_i = \text{const.}$ are assumed, then, if $v_R(f) = v_R$ is also constant within the ideal filter characteristics, the following applies:

$$F = \frac{v_R \cdot n_1 \cdot B_O + n_i \cdot B_O}{v_s \cdot n_1 \cdot B_I} = \frac{B_O}{B_I} \cdot \frac{v_R}{v_s} \cdot \left[ +1 \frac{n_i}{v_R \cdot n_i} \right] \qquad (18)$$

The noise factor according to equation (18) thus contains the cases considered in the preceding case, i.e.

1. for the linearly active four-terminal network $v_R = V_R = V_S$ and $B_O = B_I$, i.e., $$F_1 = 1 + \frac{n_i}{V_S \cdot n_1}$$

where $$\frac{n_i}{V_S \cdot n_1} = F_Z$$

with $v_S(f) = v_S = V_S$ = constant constitutes the excess spectral noise factor of the four-terminal network.

2. for the parametric converter operating in the frequency inverting case with an FM modulataed pump source $v_R = V_S$, i.e., $$F_2 = \frac{B_O}{B_I} \cdot (1 + F_Z)$$

3. for the parametric converter operating in the frequency inverting case with an AM modulated pump source as well as in the degenerated case ($p = 2s$) $v_R \neq V_S$, $B_O = B_I$, i.e.

$$F_3 = \frac{v_R}{V_S} \cdot \left(1 + \frac{n_i}{v_R \cdot n_1}\right)$$

If thus the cases with $v_R \neq v_S$ are considered in particular, it is necessary to adapt the definition of the excess noise factor to the changed conditions and to define it as $$F_Z = \frac{n_i}{v_R \cdot n_1} \qquad (19)$$

In the cases under consideration the following equation then applies:

$$F = \frac{B_O}{B_I} \cdot \frac{v_R}{V_s} \cdot (1 + F_Z) \qquad (20)$$

For a linearly active four-terminal network with $V_R = V_S$ the following again occurs in a known manner $$F_Z = \frac{n_i}{V_S \cdot n_1}$$

According to equation (12), the following conditions always apply for the linearly active four-terminal network $$n_i > 0,\ F_Z > 0 \text{ and } F > 1,$$

while in the above considered cases the following applies $$n_i > 0,\ F_Z > 0 \text{ and } F > 0 \qquad (21)$$

Figure 7:
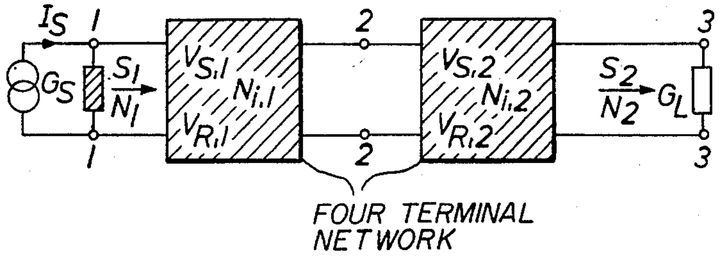

If now a cascade of two four-terminal networks according to FIG. 7 is considered, which networks have different signal and noise power amplification, i.e. in which $V_R \neq V_S$, a further improvement of the signal to noise ratio at the output of the cascade is possible.

The total noise factor of the cascade of FIG. 7 is given by the equation $$F_{total} = \frac{\frac{S_1}{N_1}}{\frac{S_2}{N_2}} = \frac{S_1 \cdot N_2}{S_2 \cdot N_1}$$

With $$S_2 = V_{s,1} \cdot V_{S,2} \cdot S_1 \qquad (22)$$

and $$N_2 = N_1 \cdot V_{R,1} \cdot V_{R,2} + N_{i,1} \cdot V_{R,2} + N_{i,2} \qquad (23)$$

it then follows that:

$$F_{total} = \frac{N_1 \cdot V_{R,1} \cdot V_{R,2} + N_{i,1} \cdot V_{R,2} + N_{i,2}}{V_{S,1} \cdot V_{S,2} \cdot N_1} = \frac{V_{R,1} \cdot V_{R,2}}{V_{S,1} \cdot V_{S,2}} \cdot \left(1 + \frac{N_{i,1}}{V_{R,1} \cdot N_1} + \frac{N_{i,2}}{V_{R,1} \cdot V_{R,2} \cdot N_1}\right)$$

With the new definition of the excess noise factor according to equation (19) there then results.

$$F_{total} = \frac{V_{R,1} \cdot V_{R,2}}{V_{S,1} \cdot V_{S,2}} \cdot \left[1 + F_{Z,1} + \frac{F_{Z,2}}{V_{R,1}}\right] \qquad (24)$$

The total "excess noise factor" of the cascade is derived in a known manner, if $V_S$ is replaced by $V_R$ to form $$F_{z,total} = F_{Z,1} + \frac{F_{Z,2}}{V_{R,1}} \qquad (25)$$

and with $V_{S,total} = V_{S,1} \cdot V_{S,2}$ as well as $V_{R,total} = V_{R,1} \cdot V_{R,2}$ $$F_{total} = \frac{V_{R,total}}{V_{S,total}} \cdot (1 + F_{Z,total}) \qquad (26)$$

With the cascade of four-terminal networks with $V_{R,1} < V_{S,1}$ and $V_{R,2} < V_{S,2}$ a further improvement of the signal to noise ratio is thus possible.

The low frequency signal is fed back to the pump oscillator P only to the extent that modulation of the pump signal will not produce distortions. If the receiving system is processing AM signals, for example, the feedback may be only so large that the modulation in the idle circuit of the parametric amplifier or in the circuit preceding the demodulator, respectively, will not exceed 100 percent.

In order to reduce the noise factor correspondingly for FM modulated signals, the fed back low frequency signal is selected so that the output band width of the receiving system preceding the demodulator is substantially narrower than the input band width of the receiver.

For practical application it is therefore recommended to make the feedback branch for the low frequency signal variable, for example, by inserting an attenuator A in the feedback path.

Finally, it can be shown that the noise factor of the receiver can be reduced according to the present invention by means of an up-converter rather than the down-converter previously discussed.

The following values are assumed to be given for such an up-converter:

$m_p = 0.4$
$m_s = 3/4$ $$\frac{G_N}{G_S} = 0.376$$

With such a converter, the low frequency signal is fed back to the converter pump to such an extent that the modulation in the idle circuit of the converter is 100 percent, i.e. $m_2 = 1.0$. Between pump frequency $p$ and signal frequency $s$ there then exists the relationship $p = 4s$.

With these values a noise factor of F = 0.83 is obtained which constitutes an improvement by the factor 2 compared to $F_0$ with an unmodulated pump source.

The configuration of the receiving system according to the present invention is particularly advantageous for satellite communication systems. The improved noise factor here permits a lower transmitter output or a larger communication range of the satellite, which is of decisive significance.

It will be understood that the above description of the present invention is susceptible to various modifications, changes and adaptations and the same are intended to be comprehended within the meaning and range of equivalents of the appended claims.

We claim:

1. In a system for receiving a high frequency signal modulated with a low frequency signal including an input stage having an input converter to whose input the received modulated high frequency signal is applied and a converter oscillator associated with said input converter, and a demodulator connected to the output of said converter for demodulating the received signal, said system having an input band width which is so narrow that the received signals can only just be received without distortion, the improvement comprising means for feeding back a portion of the low frequency output signal of said demodulator to said converter oscillator which is sufficient to reduce the noise factor of the system to below the value one, said feedback means including means for modulating said converter oscillator with said low frequency signal, the type of modulation being the same as that of the input signal to the receiver.

2. The receiving system defined in claim 1 wherein said system further includes an intermediate frequency amplifier connected between said converter and said demodulator.

3. The receiving system defined in claim 2 wherein said system includes a parametric preamplifier connected in front of said converter.

4. The receiving system defined in claim 2 wherein said converter is a parametric preamplifier, and wherein said converter oscillator is a pump source for said parametric preamplifier.

5. The receiving system defined in claim 4 wherein said parametric preamplifier is a nonreciprocal parametric amplifier.

6. The system defined in claim 5 wherein said input signal is AM modulated and said pump source is AM modulated.

7. The system defined in claim 5 wherein said input signal is FM modulated and said pump source is FM modulated.

8. The receiving system defined in claim 4 wherein said preamplifier is a parametric reflection type amplifier with circulator to achieve nonreciprocity.

9. The receiving system defined in claim 4 wherein said preamplifier is a nonreciprocal converter cascade which includes a parametric up-converter followed by a parametric down-converter; wherein said pump source is common to both said up and down converters; and wherein a phase shifting means is connected between the output of said pump source and one of said parametric converters for controlling the nonlinear elements of said parametric converters in different phases.

10. The receiving system defined in claim 6 wherein said feedback means includes means for attenuating the low frequency signal fed back to said pump source to such an extent that the modulation in the idle circuit of the parametric preamplifier or in the stage of the receiver preceding said demodulator does not exceed 100 percent.

11. The receiving system defined in claim 7 wherein said feedback means includes means for attenuating the low frequency signal fed back to said pump source in such a manner that the band width of the output signal from said intermediate frequency amplifier stage preceding said demodulation stage is substantially narrower than the input band width of said receiving system.

12. A receiving system as defined in claim 1 wherein said system is used in satellites.

* * * * *